(12) United States Patent  (10) Patent No.: US 8,198,351 B2
Xu et al.  (45) Date of Patent: Jun. 12, 2012

(54) THERMOPLASTIC POLYMER COMPOSITION

(75) Inventors: Jiannong Xu, Greer, SC (US); Jiang Li, Spartanburg, SC (US); Cristina M. Acevedo, Boiling Springs, SC (US); Robbie Willem Johan M. Hanssen, Boiling Springs, SC (US); Darin L. Dotson, Moore, SC (US); Daike Wang, Greer, SC (US); Scott R. Trenor, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 2 days.

(21) Appl. No.: 12/908,114

(22) Filed: Oct. 20, 2010

(65) Prior Publication Data

US 2011/0092625 A1 Apr. 21, 2011

Related U.S. Application Data

(63) Continuation-in-part of application No. 12/582,883, filed on Oct. 21, 2009, now abandoned.

(51) Int. Cl.
C08K 5/42 (2006.01)
(52) U.S. Cl. .......... 524/158; 526/352; 525/240
(58) Field of Classification Search .......... 524/81, 524/158; 525/240; 526/352
See application file for complete search history.

(56) References Cited

U.S. PATENT DOCUMENTS

| | | | | |
|---|---|---|---|---|
| 5,013,773 | A * | 5/1991 | Nomura et al. | 523/222 |
| 5,049,605 | A * | 9/1991 | Rekers | 524/108 |
| 5,504,128 | A * | 4/1996 | Mizutani et al. | 524/104 |
| 5,998,576 | A * | 12/1999 | Sadamitsu et al. | 530/210 |
| 6,245,843 | B1 * | 6/2001 | Kobayashi et al. | 524/109 |
| 6,861,132 | B2 * | 3/2005 | Ikeda et al. | 428/317.9 |
| 7,157,510 | B2 | 1/2007 | Xie et al. | |
| 7,235,203 | B2 | 6/2007 | Sadamitsu et al. | |
| 7,262,236 | B2 | 8/2007 | Xie et al. | |
| 2007/0036960 | A1 | 2/2007 | Lambert et al. | |

FOREIGN PATENT DOCUMENTS

| | | |
|---|---|---|
| EP | 0 336 573 A1 | 10/1989 |
| GB | 1104662 | 2/1968 |
| WO | WO 98/29496 A1 | 7/1998 |

OTHER PUBLICATIONS

International Search Report and the Written Opinion of the International Searching Authority for PCT/US2010/053345.

* cited by examiner

Primary Examiner — Robert D. Harlan
(74) Attorney, Agent, or Firm — Robert M. Lanning

(57) ABSTRACT

A thermoplastic polymer composition comprises a thermoplastic polymer and a nucleating agent. The nucleating agent comprises a compound conforming to the structure of Formula (I), Formula (II), or Formula (III)

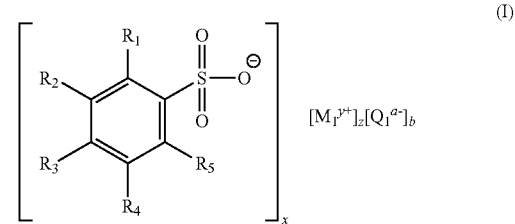

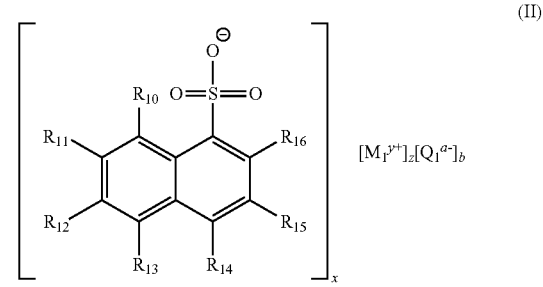

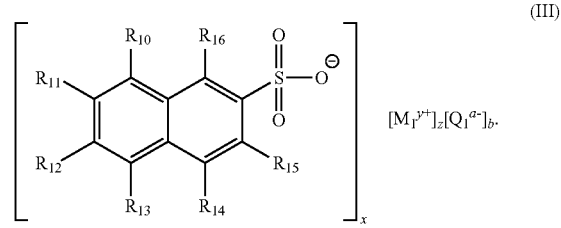

17 Claims, No Drawings

THERMOPLASTIC POLYMER COMPOSITION

CROSS-REFERENCE TO RELATED PATENT APPLICATIONS

This application is a continuation-in-part of and, pursuant to 35 U.S.C. §120, claims the benefit of the filing date of U.S. patent application Ser. No. 12/582,883 filed on Oct. 21, 2009 now abandoned.

TECHNICAL FIELD OF THE INVENTION

This application relates to nucleating agents for thermoplastic polymers, thermoplastic polymer compositions comprising such nucleating agents, articles made from such thermoplastic polymer compositions, and methods for making and molding such thermoplastic polymer compositions.

BACKGROUND OF THE INVENTION

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. The nuclei or sites provided by the nucleating agent may also reduce the size of the spherulites formed upon cooling of the polymer, which is believed to improve the optical properties (e.g., reduce the haze levels) exhibited by articles formed from the polymer.

While polymer nucleating agents may function in a similar manner, not all nucleating agents are created equal. For example, a nucleating agent may be effective at increasing the peak polymer recrystallization temperature of a thermoplastic polymer and produce a molded part exhibiting relatively low, isotropic shrinkage, but such a nucleating agent may negatively affect the optical properties (e.g., haze and/or clarity) of the thermoplastic polymer, rendering the nucleating agent ineffective for use in producing articles that must exhibit low haze and/or high clarity. Also, while nucleating agents for polyethylene polymers are known in the art, relatively few of these nucleating agents have been shown to improve the optical properties of the polyethylene polymer to any appreciable degree.

Given the complicated interrelationship of these properties and the fact that many nucleating agents exhibit less-than-optimal behavior for at least one of these properties, a need remains for nucleating agents that are capable of producing thermoplastic polymer compositions exhibiting a more desirable combination of high peak polymer crystallization temperature, improved optical properties, and high stiffness. In particular, a need remains for nucleating agents that are capable of improving the optical properties (e.g., haze and/or clarity) of polyethylene polymers without negatively impacting the polymer crystallization temperature and flexural properties exhibited by such polymers. Applicants believe that the nucleating agents and thermoplastic polymer compositions disclosed in the present application meet such a need.

BRIEF SUMMARY OF THE INVENTION

As noted above, the present invention generally relates to nucleating agents, thermoplastic polymer compositions comprising such nucleating agents, articles (e.g., molded articles) made from such thermoplastic polymer compositions, and methods for making and molding such thermoplastic polymer compositions. The nucleating agents and thermoplastic polymer compositions according to the invention are believed to be particularly well-suited for the production of thermoplastic polymer articles (e.g., molded thermoplastic polymer articles) exhibiting a desirable combination of physical properties. In particular, articles produced using the nucleating agents and thermoplastic polymer compositions of the invention are believed to exhibit a desirable combination of a peak polymer recrystallization temperature, stiffness, and optical properties (e.g., haze and/or clarity) as compared to articles made from the non-nucleated thermoplastic polymer. Applicants believe that this combination of physical properties indicate that the nucleating agents and thermoplastic polymer compositions according to the invention are well-suited for use in the production of thermoplastic polymer articles.

In a first embodiment, the invention provides a thermoplastic polymer composition comprising a thermoplastic polymer and a nucleating agent. The nucleating agent comprises a compound conforming to the structure of one of Formula (I), Formula (II), or Formula (III) below

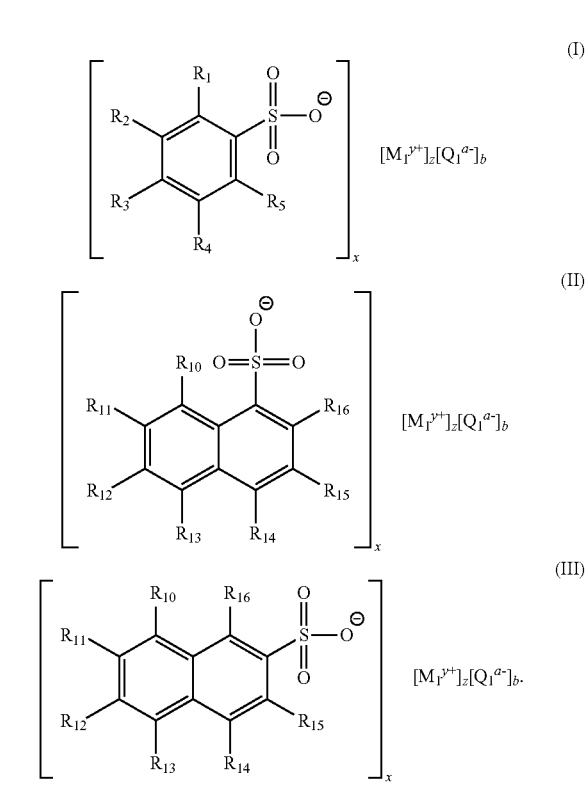

In the structures of Formulae (I), (II), and (III), x is a positive integer. $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms. Each $M_1$ is a cation selected from the group consisting of transition metal cations. The variable y is the valence of the cation, $M_1$. The variable b can be zero or a positive integer. When the value of b is one or greater, each $Q_1$ is a negatively-charged counterion, and the variable a is the valence of the negatively-charged counterion. In all of the structures, the values of x, y, z, a, and b satisfy the equation $x+(ab)=yz$.

In a second embodiment, the invention provides a thermoplastic polymer composition comprising a polyethylene polymer and a nucleating agent. The nucleating agent comprises a compound conforming to the structure of one Formula (I), (II), or (III) below

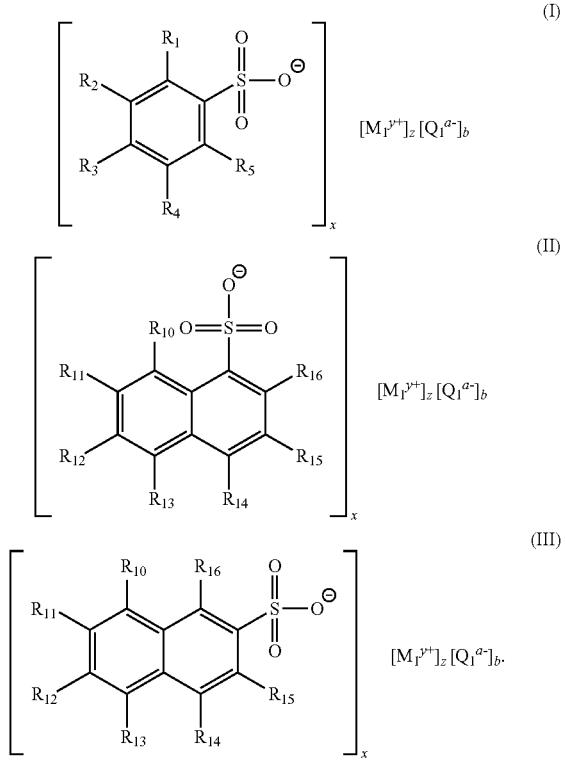

In the structures of Formulae (I), (II), and (III), x is a positive integer. $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms. Each $M_1$ is a cation selected from the group consisting of metal cations and organic cations. The variable y is the valence of the cation, $M_1$. The variable b can be zero or a positive integer. When the value of b is one or greater, each $Q_1$ is a negatively-charged counterion, and the variable a is the valence of the negatively-charged counterion. In all of the structures, the values of x, y, z, a, and b satisfy the equation $x+(ab)=yz$.

The invention also provides methods for making such a thermoplastic polymer composition and methods for using the thermoplastic polymer composition to form thermoplastic polymer articles.

DETAILED DESCRIPTION OF THE INVENTION

In a first embodiment, the invention provides a thermoplastic polymer composition comprising a thermoplastic polymer and a nucleating agent. The thermoplastic polymer of the thermoplastic polymer composition can be any suitable thermoplastic polymer. As utilized herein, the term "thermoplastic polymer" is used to refer to a polymeric material that will melt upon exposure to sufficient heat to form a flowable liquid and will return to a solidified state upon sufficient cooling. In their solidified state, such thermoplastic polymers exhibit either crystalline or semi-crystalline morphology. Suitable thermoplastic polymers include, but are not limited to, polyolefins (e.g., polyethylenes, polypropylenes, polybutylenes, and any combinations thereof), polyamides (e.g., nylon), polyurethanes, polyesters (e.g., polyethylene terephthalate), and the like, as well as any combinations thereof.

In certain embodiments, the thermoplastic polymer can be a polyolefin, such as a polypropylene, a polyethylene, a polybutylene, and a poly(4-methyl-1-pentene). In a possibly preferred embodiment, the thermoplastic polymer is a polyolefin selected from the group consisting of polypropylene homopolymers (e.g., atactic polypropylene, isotactic polypropylene, and syndiotactic polypropylene), polypropylene copolymers (e.g., polypropylene random copolymers), polypropylene impact copolymers, polyethylene, polyethylene copolymers, polybutylene, poly(4-methyl-1-pentene), and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %.

In another possibly preferred embodiment, the thermoplastic polymer can be a polyethylene. Suitable polyethylenes include, but are not limited to, low density polyethylene, linear low density polyethylene, medium density polyethylene, high density polyethylene, and combinations thereof. In certain possibly preferred embodiments, the thermoplastic polymer is selected from the group consisting of medium density polyethylene, high density polyethylene, and mixtures thereof. In another possibly preferred embodiment, the thermoplastic polymer is a high density polyethylene.

The high density polyethylene polymers suitable for use in the invention generally have a density of greater than about 0.940 g/cm³. There is no upper limit to the suitable density of the polymer, but high density polyethylene polymers typically have a density that is less than about 0.980 g/cm³ (e.g., less than about 0.975 g/cm³).

The high density polyethylene polymers suitable for use in the invention can be either homopolymers or copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 5% by weight or less (e.g., about 3 mol. % or less). As will be understood by those of ordinary skill in the art, the amount of comonomer suitable for the copolymer is largely driven by the end use for the copolymer and the required or desired polymer properties dictated by that end use.

The high density polyethylene polymers suitable for use in the invention can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which utilize a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The high density polyethylene polymers suitable for use in the invention can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis(cyclopentadienyl) $Cr^{2+}$, onto a chromium oxide catalyst, such as those described above. Suitable transition metal catalysts also include supported chromium catalysts such as those based on chromocene or a silylchromate (e.g., bi(trisphenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as —$CH_2CH_2$— or >$SiPh_2$. The metallocene catalysts typically are used in conjunction with a cocatalyst, such as methyl aluminoxane (i.e., $(Al(CH_3)_xO_y)_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing high density polyethylene include diimine complexes, such as those described in U.S. Pat. No. 5,891,963 (Brookhart et al.).

The high density polyethylene polymers suitable for use in the invention can have any suitable molecular weight (e.g., weight average molecular weight). For example, the weight average molecular weight of the high density polyethylene can be from 20,000 g/mol to about 1,000,000 g/mol or more. As will be understood by those of ordinary skill in the art, the suitable weight average molecular weight of the high density polyethylene will depend, at least in part, on the particular application or end use for which the polymer is destined. For example, a high density polyethylene polymer intended for blow molding applications can have a weight average molecular weight of about 100,000 g/mol to about 1,000,000 g/mol. A high density polyethylene polymer intended for pipe applications or film applications can have a weight average molecular weight of about 100,000 g/mol to about 500,000 g/mol. A high density polyethylene polymer intended for injection molding applications can have a weight average molecular weight of about 20,000 g/mol to about 80,000 g/mol. A high density polyethylene polymer intended for wire insulation applications, cable insulation applications, tape applications, or filament applications can have a weight average molecular weight of about 80,000 g/mol to about 400,000 g/mol. A high density polyethylene polymer intended for rotomolding applications can have a weight average molecular weight of about 50,000 g/mol to about 150,000 g/mol.

The high density polyethylene polymers suitable for use in the invention can also have any suitable polydispersity, which is defined as the value obtained by dividing the weight average molecular weight of the polymer by the number average molecular weight of the polymer. For example, the high density polyethylene polymer can have a polydispersity of greater than 2 to about 100. As understood by those skilled in the art, the polydispersity of the polymer is heavily influenced by the catalyst system used to produce the polymer, with the metallocene and other "single site" catalysts generally producing polymers with relatively low polydispersity and narrow molecular weight distributions and the other transition metal catalysts (e.g., chromium catalysts) producing polymer with higher polydispersity and broader molecular weight distributions. The high density polyethylene polymers suitable for use in the invention can also have a multimodal (e.g., bimodal) molecular weight distribution. For example, the polymer can have a first fraction having a relatively low molecular weight and a second fraction having a relatively high molecular weight. The difference between the weight average molecular weight of the fractions in the polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight.

The high density polyethylene polymers suitable for use in the invention can have any suitable melt index. For example, the high density polyethylene polymer can have a melt index of about 0.01 dg/min to about 40 dg/min. As with the weight average molecular weight, those of ordinary skill in the art understand that the suitable melt index for the high density polyethylene polymer will depend, at least in part, on the particular application or end use for which the polymer is destined. Thus, for example, a high density polyethylene polymer intended for blow molding applications can have a melt index of about 0.01 dg/min to about 1 dg/min. A high density polyethylene polymer intended for pipe applications or film applications can have a melt index of about 0.02 dg/min to about 0.8 dg/min. A high density polyethylene polymer intended for injection molding applications can have a melt index of about 2 dg/min to about 80 dg/min. A high density polyethylene polymer intended for rotomolding applications can have a melt index of about 0.5 dg/min to about 10 dg/min. A high density polyethylene polymer intended for tape applications can have a melt index of about 0.2 dg/min to about 4 dg/min. A high density polyethylene polymer intended for filament applications can have a melt index of about 1 dg/min to about 20 dg/min. The melt index of the polymer is measured using ASTM Standard D1238-04c.

The high density polyethylene polymers suitable for use in the invention generally do not contain high amounts of long-chain branching. The term "long-chain branching" is used to refer to branches that are attached to the polymer chain and are of sufficient length to affect the rheology of the polymer (e.g., branches of about 130 carbons or more in length). If desired for the application in which the polymer is to be used, the high density polyethylene polymer can contain small amounts of long-chain branching. However, the high density polyethylene polymers suitable for use in the invention typically contain very little long-chain branching (e.g., less than about 1 long-chain branch per 10,000 carbons, less than about 0.5 long-chain branches per 10,000 carbons, less than about 0.1 long-chain branches per 10,000 carbons, or less than about 0.01 long-chain branches per 10,000 carbons).

The medium density polyethylene polymers suitable for use in the invention generally have a density of about 0.926 g/cm$^3$ to about 0.940 g/cm$^3$. The term "medium density polyethylene" is used to refer to polymers of ethylene that have a density between that of high density polyethylene and linear low density polyethylene and contain relatively short branches, at least as compared to the long branches present in low density polyethylene polymers produced by the free radical polymerization of ethylene at high pressures.

The medium density polyethylene polymers suitable for use in the invention generally are copolymers of ethylene and at least one $\alpha$-olefin, such as 1-butene, 1-hexene, 1-octene, 1-decene, and 4-methyl-1-pentene. The $\alpha$-olefin comonomer can be present in any suitable amount, but typically is present in an amount of less than about 8% by weight (e.g., less than about 5 mol %). As will be understood by those of ordinary skill in the art, the amount of comonomer suitable for the copolymer is largely driven by the end use for the copolymer and the required or desired polymer properties dictated by that end use.

The medium density polyethylene polymers suitable for use in the invention can be produced by any suitable process. Like the high density polyethylene polymers, the medium density polyethylene polymers typically are produced in "low pressure" catalytic processes such as any of the processes described above in connection with the high density polyethylene polymers suitable for use in the invention. Examples of suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The medium density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The medium density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride).

The medium density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The medium density polyethylene polymers suitable for use in the invention can also be produced using supported chromium catalysts such as those described above in the discussion of catalysts suitable for making high density polyethylene. The medium density polyethylene polymers suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boron-aromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—$SiR_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The medium density polyethylene polymers suitable for use in the invention can have any suitable compositional uniformity, which is a term used to describe the uniformity of the branching in the copolymer molecules of the polymer. Many commercially-available medium density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of medium density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The medium density polyethylene polymers suitable for use in the invention can have any suitable molecular weight. For example, the polymer can have a weight average molecular weight of about 50,000 g/mol to about 200,000 g/mol. As will be understood by those of ordinary skill in the art, the suitable weight average molecular weight of the medium density polyethylene will depend, at least in part, on the particular application or end use for which the polymer is destined.

The medium density polyethylene polymers suitable for use in the invention can also have any suitable polydispersity. Many commercially available medium density polyethylene polymers have a polydispersity of about 2 to about 30. The medium density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal medium density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The medium density polyethylene polymers suitable for use in the invention can have any suitable melt index. For example, the medium density polyethylene polymer can have a melt index of about 0.01 dg/min to about 200 dg/min. As with the weight average molecular weight, those of ordinary skill in the art understand that the suitable melt index for the medium density polyethylene polymer will depend, at least in part, on the particular application or end use for which the polymer is destined. Thus, for example, a medium density polyethylene polymer intended for blow molding applications or pipe applications can have a melt index of about 0.01 dg/min to about 1 dg/min. A medium density polyethylene polymer intended for film applications can have a melt index of about 0.5 dg/min to about 3 dg/min. A medium density polyethylene polymer intended for injection molding applications can have a melt index of about 6 dg/min to about 200 dg/min. A medium density polyethylene polymer intended for rotomolding applications can have a melt index of about 4 dg/min to about 7 dg/min. A medium density polyethylene polymer intended for wire and cable insulation applications can have a melt index of about 0.5 dg/min to about 3 dg/min. The melt index of the polymer is measured using ASTM Standard D1238-04c.

The medium density polyethylene polymers suitable for use in the invention generally do not contain a significant amount of long-chain branching. For example, the medium density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The linear low density polyethylene polymers suitable for use in the invention generally have a density of 0.925 g/cm$^3$ or less (e.g., about 0.910 g/cm$^3$ to about 0.925 g/cm$^3$). The term "linear low density polyethylene" is used to refer to lower density polymers of ethylene having relatively short branches, at least as compared to the long branches present in low density polyethylene polymers produced by the free radical polymerization of ethylene at high pressures.

The linear low density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 6 mol. % (e.g., about 2 mol % to about 5 mol %). As will be understood by those of ordinary skill in the art, the amount of comonomer suitable for the copolymer is largely driven by the end use for the copolymer and the required or desired polymer properties dictated by that end use.

The linear low density polyethylene polymers suitable for use in the invention can be produced by any suitable process. Like the high density polyethylene polymers, the linear low density polyethylene polymers typically are produced in "low pressure" catalytic processes such as any of the processes described above in connection with the high density polyethylene polymers suitable for use in the invention. Suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The linear low density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The linear low density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The linear low density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The linear low density polyethylene polymers suitable for use in the invention can also be produced using supported chromium catalysts such as those described above in the discussion of catalysts suitable for making high density polyethylene. The linear low density polyethylene suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boron-aromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3 CH_3^-$. A fourth class of metallocene catalysts that can be used are metallocene-based complexes of a transition metal, such as titanium, containing one cyclopentadienyl ligand in combination with another ligand, such as a phosphinimine or —O—$SiR_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The linear low density polyethylene polymers suitable for use in the invention can have any suitable compositional uniformity, which is a term used to describe the uniformity of the branching in the copolymer molecules of the polymer. Many commercially-available linear low density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of linear low density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The linear low density polyethylene polymers suitable for use in the invention can have any suitable molecular weight. For example, the polymer can have a weight average molecular weight of about 20,000 g/mol to about 250,000 g/mol. As will be understood by those of ordinary skill in the art, the suitable weight average molecular weight of the linear low density polyethylene will depend, at least in part, on the particular application or end use for which the polymer is destined.

The linear low density polyethylene polymers suitable for use in the invention can also have any suitable polydispersity. Many commercially available linear low density polyethylene polymers have a relatively narrow molecular weight distribution and thus a relatively low polydispersity, such as about 2 to about 5 (e.g., about 2.5 to about 4.5 or about 3.5 to about 4.5). The linear low density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal linear low density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The linear low density polyethylene polymers suitable for use in the invention can have any suitable melt index. For example, the linear low density polyethylene polymer can have a melt index of about 0.01 dg/min to about 200 dg/min. As with the weight average molecular weight, those of ordinary skill in the art understand that the suitable melt index for the linear low density polyethylene polymer will depend, at least in part, on the particular application or end use for which the polymer is destined. Thus, for example, a linear low density polyethylene polymer intended for blow molding applications or pipe applications can have a melt index of about 0.01 dg/min to about 1 dg/min. A linear low density polyethylene polymer intended for film applications can have a melt index of about 0.5 dg/min to about 3 dg/min. A linear low density polyethylene polymer intended for injection molding applications can have a melt index of about 6 dg/min to about 200 dg/min. A linear low density polyethylene polymer intended for rotomolding applications can have a melt index of about 4 dg/min to about 7 dg/min. A linear low density polyethylene polymer intended for wire and cable insulation applications can have a melt index of about 0.5 dg/min to about 3 dg/min. The melt index of the polymer is measured using ASTM Standard D1238-04c.

The linear low density polyethylene polymers suitable for use in the invention generally do not contain a significant amount of long-chain branching. For example, the linear low density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The low density polyethylene polymers suitable for use in the invention generally have a density of less than 0.935 g/cm$^3$ and, in contrast to high density polyethylene, medium density polyethylene and linear low density polyethylene, have a relatively large amount of long-chain branching in the polymer.

The low density polyethylene polymers suitable for use in the invention can be either ethylene homopolymers or copolymers of ethylene and a polar comonomer. Suitable polar comonomers include, but are not limited to, vinyl acetate, methyl acrylate, ethyl acrylate, and acrylic acid. These comonomers can be present in any suitable amount, with comonomer contents as high as 20% by weight being used for certain applications. As will be understood by those skilled in the art, the amount of comonomer suitable for the polymer is largely driven by the end use for the polymer and the required or desired polymer properties dictated by that end use.

The low density polyethylene polymers suitable for use in the invention can be produced using any suitable process, but typically the polymers are produced by the free-radical initiated polymerization of ethylene at high pressure (e.g., about 81 to about 276 MPa) and high temperature (e.g., about 130 to about 330° C.). Any suitable free radical initiator can be used in such processes, with peroxides and oxygen being the most common. The free-radical polymerization mechanism gives rise to short-chain branching in the polymer and also to the relatively high degree of long-chain branching that distinguishes low density polyethylene from other ethylene polymers (e.g., high density polyethylene and linear low density polyethylene). The polymerization reaction typically is performed in an autoclave reactor (e.g., a stirred autoclave reactor), a tubular reactor, or a combination of such reactors positioned in series.

The low density polyethylene polymers suitable for use in the invention can have any suitable molecular weight. For example, the polymer can have a weight average molecular weight of about 30,000 g/mol to about 500,000 g/mol. As will be understood by those of ordinary skill in the art, the suitable weight average molecular weight of the low density polyethylene will depend, at least in part, on the particular application or end use for which the polymer is destined. For example, a low density polyethylene polymer intended for blow molding applications can have a weight average molecular weight of about 80,000 g/mol to about 200,000 g/mol. A low density polyethylene polymer intended for pipe applications can have a weight average molecular weight of about 80,000 g/mol to about 200,000 g/mol. A low density polyethylene polymer intended for injection molding applications can have a weight average molecular weight of about 30,000 g/mol to about 80,000 g/mol. A low density polyethylene polymer intended for film applications can have a weight average molecular weight of about 60,000 g/mol to about 500,000 g/mol.

The low density polyethylene polymers suitable for use in the invention can have any suitable melt index. For example, the low density polyethylene polymer can have a melt index of about 0.2 to about 100 dg/min. As noted above, the melt index of the polymer is measured using ASTM Standard D1238-04c.

As noted above, one of the major distinctions between low density polyethylene and other ethylene polymers is a relatively high degree of long-chain branching within the polymer. The low density polyethylene polymers suitable for use in the invention can exhibit any suitable amount of long-chain branching, such as about 0.01 or more long-chain branches per 10,000 carbon atoms, about 0.1 or more long-chain branches per 10,000 carbon atoms, about 0.5 or more long-chain branches per 10,000 carbon atoms, about 1 or more long-chain branches per 10,000 carbon atoms, or about 4 or more long-chain branches per 10,000 carbon atoms. While there is not a strict limit on the maximum extent of long-chain branching that can be present in the low density polyethylene polymers suitable for use in the invention, the long-chain branching in many low density polyethylene polymers is less than about 100 long-chain branches per 10,000 carbon atoms.

The thermoplastic polymer composition also comprises a nucleating agent. As utilized herein, the term "nucleating agent" is used to refer to compounds or additives that form nuclei or provide sites for the formation and/or growth of crystals in a polymer as it solidifies from a molten state. The nucleating agent comprises a compound conforming to the structure of one of Formula (I), (II), or (III) below

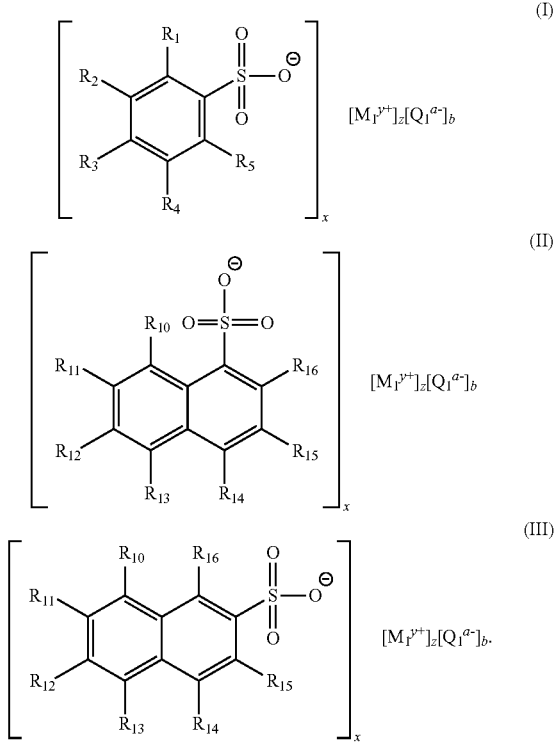

In each of the structures of Formula (I), Formula (II), and Formula (III), x is a positive integer. $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms. Each $M_1$ is a cation, and the variable y is the valence of the cation. The variable b can be zero or a positive integer. When the value of b is one or greater, each $Q_1$ is a negatively-charged counterion, and the variable a is the valence of the negatively-charged counterion. In all of the structures, the values of x, y, z, a, and b satisfy the equation $x+(ab)=yz$.

As noted above, $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms. In certain possibly preferred embodiments, the substituents attached to the aromatic rings are relatively small and, thus, $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_6$ alkyl groups, $C_1$-$C_6$ alkenyl groups, $C_1$-$C_6$ alkynyl groups, $C_1$-$C_6$ alkoxy groups, $C_1$-$C_6$ hydroxyalkyl groups, $C_1$-$C_6$ alkyl ether groups, and halogens. In certain other possibly preferred embodiments, the aromatic rings are unsubstituted except for the sulfonate group, meaning that $R_1$, $R_2$, $R_3$, $R_4$, $R_5$, $R_{10}$, $R_{11}$, $R_{12}$, $R_{13}$, $R_{14}$, $R_{15}$, and $R_{16}$ are each hydrogen.

As noted above, $M_1$ represents a cation. Suitable cations include, but are not limited to, alkali metal cations (e.g., sodium), alkaline earth metal cations (e.g., calcium), transition metal cations (e.g., zinc), group 13 metal cations (e.g., aluminum), and organic cations (e.g., piperazinium cation). As utilized herein, the term "transition metal" is used to refer those elements in the d-block of the periodic table of elements, which corresponds to groups 3 to 12 on the periodic table of elements. In those embodiments in which the thermoplastic polymer composition comprises any suitable thermoplastic polymer, $M_1$ preferably is selected from the group consisting of transition metal cations. In a more specific embodiment of such compositions, $M_1$ preferably is zinc.

In those embodiments in which the thermoplastic polymer comprises a polyethylene polymer, $M_1$ preferably is selected from the group consisting of metal cations and organic cations. In a more specific embodiment of such compositions, $M_1$ preferably is a metal cation selected from the group consisting of alkali metal cations, alkaline earth metal cations, transition metal cations, and group 13 metal cations. In yet another more specific embodiment of such compositions, $M_1$ preferably is a metal cation selected from the group consisting of aluminum, calcium, magnesium, sodium, and zinc. In yet another more specific embodiment of such compositions, $M_1$ preferably is an organic cation (e.g., a piperazinium cation).

In the structures of Formulae (I) and (II), $Q_1$ can represent a negatively-charged counterion. The negatively-charged counterion can be any suitable anion including, but not limited to, halides (e.g., chloride), hydroxide, and oxide anions.

In a potentially preferred embodiment of the thermoplastic polymer composition, the nucleating agent comprises a compound conforming to the structure of Formula (I) wherein $R_1$-$R_5$ are each hydrogen and $M_1$ is zinc. Also, in this embodiment, x is 2, y is 2, z is 1, and b is 0. In this embodiment, the thermoplastic polymer can be any of the thermoplastic polymers described above, with a polyethylene polymer, such as a high density polyethylene polymer, being particularly preferred.

In another potentially preferred embodiment of the thermoplastic polymer composition, the nucleating agent comprises a compound conforming to the structure of Formula (I) wherein $R_1$-$R_5$ are each hydrogen and $M_1$ is magnesium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$-$R_5$ are each hydrogen and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$-$R_5$ are each hydrogen and $M_1$ is aluminum. Also, in this embodiment, x is 2, y is 3, z is 1, b is 1, and $Q_1$ is a hydroxide anion. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$-$R_5$ are each hydrogen and $M_1$ is sodium. Also, in this embodiment, x is 1, y is 1, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$-$R_5$ are each hydrogen and $M_1$ is a piperazinium cation. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$, $R_2$, $R_4$, and $R_5$ are each hydrogen, $R_3$ is methyl, and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$, $R_2$, $R_4$, and $R_5$ are each hydrogen, $R_3$ is methyl, and $M_1$ is sodium. Also, in this embodiment, x is 1, y is 1, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$, $R_2$, $R_4$, and $R_5$ are each hydrogen, $R_3$ is methyl, and $M_1$ is zinc. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$, $R_2$, $R_4$, and $R_5$ are each hydrogen, $R_3$ is ethyl, and $M_1$ is zinc. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein $R_1$, $R_2$, $R_4$, and $R_5$ are each hydrogen, $R_3$ is ethyl, and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (I) wherein one of $R_1$, $R_2$, $R_3$, $R_4$, and $R_5$ is isopropyl, the remainder of $R_1$, $R_2$, $R_3$, $R_4$, and $R_5$ are each hydrogen, and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred. In a more specific and potentially preferred embodiment of such a thermoplastic polymer composition, the nucleating agent comprises a compound conforming to the structure of Formula (I) wherein $R_1$, $R_2$, $R_4$, and $R_5$ are each hydrogen, $R_3$ is isopropyl, and $M_1$ is calcium.

In another potentially preferred embodiment of the thermoplastic polymer composition, the nucleating agent comprises a compound conforming to the structure of Formula (I) wherein two of $R_1$, $R_2$, $R_3$, $R_4$, and $R_5$ are methyl, the remainder of $R_1$, $R_2$, $R_3$, $R_4$, and $R_5$ are each hydrogen, and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred. In a more specific and potentially preferred embodiment of such a thermoplastic polymer composition, the nucleating agent comprises a compound conforming to the structure of Formula (I) wherein $R_2$, $R_3$, and $R_5$ are each hydrogen, $R_1$ and $R_4$ are each methyl, and $M_1$ is calcium.

In another potentially preferred embodiment of the thermoplastic polymer composition, the nucleating agent comprises a compound conforming to the structure of Formula (I) wherein two of $R_1$, $R_2$, $R_3$, $R_4$, and $R_5$ are methyl, the remainder of $R_1$, $R_2$, $R_3$, $R_4$, and $R_5$ are each hydrogen, and $M_1$ is sodium. Also, in this embodiment, x is 1, y is 1, z is 1, and b is 0. In this embodiment, the thermoplastic polymer preferably is a polyethylene polymer, with a high density polyethylene polymer being particularly preferred. In a more specific and potentially preferred embodiment of such a thermoplastic polymer composition, the nucleating agent comprises a compound conforming to the structure of Formula (I) wherein $R_2$, $R_3$, and $R_5$ are each hydrogen, $R_1$ and $R_4$ are each methyl, and $M_1$ is sodium.

In another potentially preferred embodiment of the thermoplastic polymer composition, the nucleating agent comprises a compound conforming to the structure of Formula (III) wherein $R_{10}$-$R_{16}$ are each hydrogen and $M_1$ is calcium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (III) wherein $R_{10}$-$R_{16}$ are each hydrogen and $M_1$ is magnesium. Also, in this embodiment, x is 2, y is 2, z is 1, and b is 0. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (III) wherein $R_{10}$-$R_{16}$ are each hydrogen and $M_1$ is aluminum. Also, in this embodiment, x is 2, y is 3, z is 1, b is 1, and $Q_1$ is a hydroxide anion. In this embodiment, the thermoplastic polymer preferably is a polyethylene polymer, with a high density polyethylene polymer being particularly preferred.

In another potentially preferred embodiment of the thermoplastic polymer composition, the nucleating agent comprises a compound conforming to the structure of Formula (III) wherein $R_{10}$-$R_{16}$ are each hydrogen and $M_1$ is zinc. Also, in this embodiment, x is 2, y is 2, z is 1, and b is 0. In this embodiment, the thermoplastic polymer preferably is a polyethylene polymer, with a high density polyethylene polymer being particularly preferred.

The compounds of Formulae (I), (II), and (III) can be synthesized using any suitable technique, many of which will be readily apparent to those of ordinary skill in the art. For example, if the acid used in making the compound is commercially available, the compound can be prepared by reacting the acid with a suitable base (e.g., a base comprising the desired metal cation and a Lowry-Brønsted base) in a suitable medium (e.g., an aqueous medium). If the acid(s) to be used in making the compound are not commercially available, the acid(s) can be synthesized using techniques known in the art. Once the desired acid is obtained, the compound can be produced as described above (e.g., by reacting the acid with a suitable base in an appropriate medium).

The nucleating agent can be present in the thermoplastic polymer composition in any suitable amount. The nucleating agent can be present in the thermoplastic polymer composition in an amount of about 50 parts per million (ppm) or more, about 100 ppm or more, about 250 ppm or more, or about 500 ppm or more, based on the total weight of the thermoplastic polymer composition. The nucleating agent typically is present in the thermoplastic polymer composition in an amount of about 10,000 ppm or less, about 7,500 ppm or less, about 5,000 ppm or less, or about 4,000 ppm or less, based on the total weight of the thermoplastic polymer composition. Thus, in certain embodiments of the thermoplastic polymer composition, the nucleating agent is present in the thermoplastic polymer composition in an amount of about 50 to about 10,000 ppm, about 100 to about 7,500 ppm (e.g., about 100 to about 5,000 ppm), about 250 ppm to about 5,000 ppm (e.g., about 250 ppm to about 4,000 ppm), or about 500 ppm to about 5,000 ppm (e.g., about 500 to about 4,000 ppm), based on the total weight of the polymer composition.

The thermoplastic polymer composition of the invention can also be provided in the form of a masterbatch composition designed for addition or let-down into a virgin thermoplastic polymer. In such an embodiment, the thermoplastic polymer composition will generally contain a higher amount of the nucleating agent as compared to a thermoplastic polymer composition intended for use in the formation of an article of manufacture without further dilution or addition to a virgin thermoplastic polymer. For example, the nucleating agent can be present in such a thermoplastic polymer composition in an amount of about 1 wt. % to about 10 wt. % (e.g., about 1 wt. % to about 5 wt. % or about 2 wt. % to about 4 wt. %), based on the total weight of the thermoplastic polymer composition.

The thermoplastic polymer composition of the invention can contain other polymer additives in addition to the aforementioned nucleating agent. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

As noted above, the thermoplastic polymer composition of the invention can contain other nucleating agents in addition to those compounds conforming to the structure of Formula (I) or Formula (II). Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl)phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the thermoplastic polymer composition of the invention can also contain a clarifying agent. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a monoacetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The thermoplastic polymer composition of the invention can be produced by any suitable method or process. For example, the thermoplastic polymer composition can be produced by simple mixing of the individual components of the thermoplastic polymer composition (e.g., thermoplastic polymer, nucleating agent, and other additives, if any). The thermoplastic polymer composition can also be produced by mixing the individual components under high shear or high intensity mixing conditions. The thermoplastic polymer composition of the invention can be provided in any form suitable for use in further processing to produce an article of manufacture from the thermoplastic polymer composition. For example, the thermoplastic polymer compositions can be provided in the form of a powder (e.g., free-flowing powder), flake, pellet, prill, tablet, agglomerate, and the like.

The thermoplastic polymer composition of the invention is believed to be useful in producing thermoplastic polymer articles of manufacture. The thermoplastic polymer composition of the invention can be formed into a desired thermoplastic polymer article of manufacture by any suitable technique, such as injection molding (e.g., multicomponent molding, overmolding, or 2K molding), injection rotational molding, blow molding (e.g., extrusion blow molding, injection blow molding, or injection stretch blow molding), extrusion (e.g., sheet extrusion, film extrusion, cast film extrusion, pipe extrusion, or foam extrusion), thermoforming, rotomolding, film blowing (blown film), film casting (cast film), and the like. Thermoplastic polymer articles made using the thermoplastic polymer composition of the invention can be comprised of multiple layers (e.g., multilayer blown or cast films or multilayer injection molded articles), with one or any suitable number of the multiple layers containing a thermoplastic polymer composition of the invention.

The thermoplastic polymer composition of the invention can be used to produce any suitable article of manufacture. Suitable articles of manufacture include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

EXAMPLE 1

This example demonstrates the production of a compound conforming to the structure of Formula (I), which is suitable for use as a nucleating agent in accordance with the invention. Approximately 250 grams (1.4 mol) of benzenesulfonic acid monohydrate was added to a beaker containing approximately 1,000 mL of distilled water. Approximately 57.8 grams (0.7 mol) of zinc oxide was then added to the beaker. The resulting solution was stirred at room temperature for approximately 30 minutes. The water was removed from the mixture using a rotary evaporator. The resulting solid product, which was determined to be zinc benzenesulfonate, was then dried in an oven overnight at a temperature of approximately 110° C. The solid was ground to a powder suitable for use as a nucleating agent for thermoplastics.

EXAMPLE 2

This example demonstrates the production of a compound conforming to the structure of Formula (I), which is suitable for use as a nucleating agent in accordance with the invention. Approximately 200 grams (1.14 mol) of benzenesulfonic acid monohydrate was added to a beaker containing approximately 1,000 mL of distilled water. Approximately 33 grams (0.57 mol) of magnesium hydroxide was then added to the beaker. The resulting solution was stirred at room temperature for approximately 30 minutes. The water was removed from the mixture using a rotary evaporator. The resulting solid product, which was determined to be magnesium benzenesulfonate, was then dried in an oven overnight at a temperature of approximately 110° C. The solid was ground to a powder suitable for use as a nucleating agent for thermoplastics.

EXAMPLE 3

This example demonstrates the production of a compound conforming to the structure of Formula (I), which is suitable for use as a nucleating agent in accordance with the invention. Approximately 50 grams (0.28 mol) of benzenesulfonic acid monohydrate was added to a beaker containing approximately 500 mL of distilled water. Approximately 10.5 grams (0.14 mol) of calcium hydroxide was then added to the beaker. The resulting solution was stirred at room temperature for approximately 30 minutes. The water was removed from the mixture using a rotary evaporator. The resulting solid product, which was determined to be calcium benzenesulfonate, was then dried in an oven overnight at a temperature of approximately 110° C. The solid was ground to a powder suitable for use as a nucleating agent for thermoplastics.

EXAMPLE 4

This example demonstrates the production of a compound conforming to the structure of Formula (III), which is suitable for use as a nucleating agent in accordance with the invention. Approximately 10.2 grams (0.04 mol) of sodium 2-napthalenesulfonate was added to a beaker containing approximately 200 mL of distilled water. Approximately 4 grams (0.013 mol) of aluminum sulfate was then added to the beaker. The resulting mixture was stirred for approximately 120 minutes while being cooled by an ice water bath. The precipitate that formed during the reaction was collected from the mixture via filtration. The resulting solid product, which was determined to contain aluminum 2-naphthalenesulfonate hydroxide (basic aluminum 2-naphthalenesulfonate), was then dried in an oven overnight at a temperature of approximately 110° C. The solid was ground to a powder suitable for use as a nucleating agent for thermoplastics.

EXAMPLE 5

This example demonstrates the production of a compound conforming to the structure of Formula (III), which is suitable for use as a nucleating agent in accordance with the invention. Approximately 10.2 grams (0.04 mol) of sodium 2-napthalenesulfonate was added to a beaker containing approximately 500 mL of distilled water. Approximately 2.7 grams (0.002 mol) of zinc chloride was then added to the beaker. The resulting mixture was stirred for approximately 120 minutes while being cooled by an ice water bath. The precipitate that formed during the reaction was collected from the mixture via filtration. The resulting solid product, which was determined to contain zinc 2-naphthalenesulfonate, was then dried in an oven overnight at a temperature of approximately 110° C. The solid was ground to a powder suitable for use as a nucleating agent for thermoplastics.

EXAMPLE 6

This example demonstrates the production of a compound conforming to the structure of Formula (III), which is suitable for use as a nucleating agent in accordance with the invention. Approximately 10.2 grams (0.04 mol) of sodium 2-napthalenesulfonate was added to a beaker containing approximately 500 mL of distilled water. Approximately 2.9 grams (0.02 mol) of anhydrous calcium chloride was then added to the beaker. The resulting mixture was stirred for approximately 120 minutes while being cooled by an ice water bath. The precipitate that formed during the reaction was collected from the mixture via filtration. The resulting solid product, which was determined to contain calcium 2-naphthalenesulfonate, was then dried in an oven overnight at a temperature of approximately 110° C. The solid was ground to a powder suitable for use as a nucleating agent for thermoplastics.

EXAMPLE 7

This example demonstrates the production of a compound conforming to the structure of Formula (III), which is suitable for use as a nucleating agent in accordance with the invention. Approximately 10.2 grams (0.04 mol) of sodium 2-napthalenesulfonate was added to a beaker containing approximately 500 mL of distilled water. Approximately 2.4 grams (0.02 mol) of magnesium sulfate was then added to the beaker. The resulting mixture was stirred for approximately 120 minutes while being cooled by an ice water bath. The precipitate that formed during the reaction was collected from the mixture via filtration. The resulting solid product, which was determined to contain magnesium 2-naphthalenesulfonate, was then dried in an oven overnight at a temperature of approximately 110° C. The solid was ground to a powder suitable for use as a nucleating agent for thermoplastics.

EXAMPLE 8

This example demonstrates the production of a compound conforming to the structure of Formula (I), which is suitable for use as a nucleating agent in accordance with the invention. Approximately 7.5 grams (0.04 mol) of 4-ethylbenzenesulfonic acid was added to a beaker containing approximately 300 mL of distilled water. Approximately 1.5 grams (0.02 mol) of calcium hydroxide was then added to the beaker. The resulting solution was stirred at room temperature for approximately 30 minutes. The water was removed from the mixture using a rotary evaporator. The resulting solid product, which was determined to be calcium 4-ethylbenzenesulfonate, was then dried in an oven overnight at a temperature of approximately 110° C. The solid was ground to a powder suitable for use as a nucleating agent for thermoplastics.

EXAMPLE 9

This example demonstrates the production of a compound conforming to the structure of Formula (I), which is suitable for use as a nucleating agent in accordance with the invention. Approximately 7.5 grams (0.04 mol) of 4-ethylbenzenesulfonic acid was added to a beaker containing approximately 300 mL of distilled water. Approximately 1.6 grams (0.02 mol) of zinc oxide was then added to the beaker. The resulting solution was stirred at room temperature for approximately 30 minutes. The water was removed from the mixture using a rotary evaporator. The resulting solid product, which was determined to be zinc 4-ethylbenzenesulfonate, was then dried in an oven overnight at a temperature of approximately 110° C. The solid was ground to a powder suitable for use as a nucleating agent for thermoplastics.

EXAMPLE 10

This example demonstrates the production of a compound conforming to the structure of Formula (I), which is suitable for use as a nucleating agent in accordance with the invention. Approximately 15.00 grams (0.0772 mol) of p-toluenesulfonic acid was added to a beaker containing approximately 200 mL of deionized water. Approximately 3.1880 grams (0.0773 mol) of sodium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be sodium p-toluenesulfonate, was ground to a powder suitable for use as a nucleating agent for thermoplastics.

EXAMPLE 11

This example demonstrates the production of a compound conforming to the structure of Formula (I), which is suitable for use as a nucleating agent in accordance with the invention. Approximately 20.00 grams (0.0952 mol) of cumenesulfonic acid (i.e., a mixture of isopropylbenzenesulfonic acid isomers) was added to a beaker containing approximately 200 mL of deionized water. Approximately 3.9287 grams (0.0953 mol) of sodium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be sodium cumenesulfonate (i.e., a mixture of sodium isopropylbenzenesulfonate isomers), was ground to a powder suitable for use as a nucleating agent for thermoplastics.

EXAMPLE 12

This example demonstrates the production of a compound conforming to the structure of Formula (I), which is suitable for use as a nucleating agent in accordance with the invention. Approximately 20.06 grams (0.0987 mol) of xylenesulfonic acid (i.e., a mixture of dimethylbenzenesulfonic acid isomers) was added to a beaker containing approximately 200 mL of deionized water. Approximately 4.0986 grams (0.0994 mol) of sodium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be sodium xylenesulfonate (i.e., a mixture of sodium dimethylbenzenesulfonate isomers), was ground to a powder suitable for use as a nucleating agent for thermoplastics.

EXAMPLE 13

This example demonstrates the production of a compound conforming to the structure of Formula (I), which is suitable for use as a nucleating agent in accordance with the invention. Approximately 15.00 grams (0.0772 mol) of p-toluenesulfonic acid was added to a beaker containing approximately 200 mL of deionized water. Approximately 3.0107 grams (0.0386 mol) of calcium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be calcium p-toluenesulfonate, was ground to a powder suitable for use as a nucleating agent for thermoplastics.

EXAMPLE 14

This example demonstrates the production of a compound conforming to the structure of Formula (I), which is suitable for use as a nucleating agent in accordance with the invention. Approximately 20.01 grams (0.0953 mol) of cumenesulfonic acid (i.e., a mixture of isopropylbenzenesulfonic acid isomers) was added to a beaker containing approximately 200 mL of deionized water. Approximately 3.7140 grams (0.0953 mol) of calcium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be calcium cumenesulfonate (i.e., a mixture of calcium isopropylbenzenesulfonate isomers), was ground to a powder suitable for use as a nucleating agent for thermoplastics.

EXAMPLE 15

This example demonstrates the production of a compound conforming to the structure of Formula (I), which is suitable for use as a nucleating agent in accordance with the invention. Approximately 20.00 grams (0.0984 mol) of xylenesulfonic acid (i.e., a mixture of dimethylbenzenesulfonic acid isomers) was added to a beaker containing approximately 200 mL of deionized water. Approximately 3.8367 grams (0.0492 mol) of calcium hydroxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be calcium xylenesulfonate (i.e., a mixture of calcium dimethylbenzenesulfonate isomers), was ground to a powder suitable for use as a nucleating agent for thermoplastics.

EXAMPLE 16

This example demonstrates the production of a compound conforming to the structure of Formula (I), which is suitable for use as a nucleating agent in accordance with the invention. Approximately 15.00 grams (0.0772 mol) of p-toluenesulfonic acid was added to a beaker containing approximately 200 mL of deionized water. Approximately 3.1421 grams (0.0386 mol) of zinc oxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be zinc p-toluenesulfonate, was ground to a powder suitable for use as a nucleating agent for thermoplastics.

EXAMPLE 17

This example demonstrates the production of a compound conforming to the structure of Formula (I), which is suitable for use as a nucleating agent in accordance with the invention. Approximately 15.01 grams (0.0715 mol) of cumenesulfonic acid (i.e., a mixture of isopropylbenzenesulfonic acid isomers) was added to a beaker containing approximately 200 mL of deionized water. Approximately 2.9063 grams (0.0357 mol) of zinc oxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be zinc cumenesulfonate (i.e., a mixture of zinc isopropylbenzenesulfonate isomers), was ground to a powder suitable for use as a nucleating agent for thermoplastics.

EXAMPLE 18

This example demonstrates the production of a compound conforming to the structure of Formula (I), which is suitable for use as a nucleating agent in accordance with the invention. Approximately 15.04 grams (0.0740 mol) of xylenesulfonic acid (i.e., a mixture of dimethylbenzenesulfonic acid isomers) was added to a beaker containing approximately 200 mL of deionized water. Approximately 3.0025 grams (0.0369 mol) of zinc oxide was then added to the beaker. The resulting solution was stirred at room temperature for approximately 30 minutes. The water was removed from the mixture using a rotary evaporator. The resulting solid product was then dried in an oven overnight at a temperature of approximately 105° C. The solid, which was determined by FTIR analysis to be zinc xylenesulfonate (i.e., a mixture of zinc dimethylbenzenesulfonate isomers), was ground to a powder suitable for use as a nucleating agent for thermoplastics.

EXAMPLE 19

This example demonstrates the production of a compound conforming to the structure of Formula (I), which is suitable for use as a nucleating agent in accordance with the invention. Approximately 17.6 grams (0.1 mol) of benzenesulfonic acid monohydrate and approximately 4.5 grams (0.05 mol) of piperazine were added to a beaker containing approximately 200 mL of deionized water. The resulting solution was stirred at room temperature for approximately 30 minutes. The water was removed from the mixture using a rotary evaporator. The resulting solid product was then dried in an oven overnight at a temperature of approximately 100° C. The solid, which was determined to be piperazinium benzenesulfonate, was ground to a powder suitable for use as a nucleating agent for thermoplastics.

EXAMPLE 20

This example demonstrates the production of a compound conforming to the structure of Formula (I), which is suitable for use as a nucleating agent in accordance with the invention. Approximately 20 grams (0.11 mol) of benzenesulfonic acid monohydrate was added to a beaker containing approximately 200 mL of distilled water. Approximately 10 grams of a 50% (w/w) sodium hydroxide solution was then added to the beaker. The resulting solution was stirred at room temperature for approximately 60 minutes. The water was removed from the mixture using a rotary evaporator. The resulting solid product, which was determined to be sodium benzenesulfonate, was then dried in an oven overnight at a temperature of approximately 110° C. The solid was ground to a powder suitable for use as a nucleating agent for thermoplastics.

EXAMPLE 21

This example demonstrates the production of a compound conforming to the structure of Formula (I), which is suitable for use as a nucleating agent in accordance with the invention. Approximately 20 grams (0.11 mol) of benzenesulfonic acid monohydrate was added to a beaker containing approximately 200 mL of distilled water. Approximately 3.0 grams (0.04 mol) of aluminum hydroxide was then added to the beaker. The resulting solution was stirred at room temperature for approximately 30 minutes. The water was removed from the mixture using a rotary evaporator. The resulting solid product, which was determined to be aluminum benzenesulfonate hydroxide (basic aluminum benzenesulfonate), was then dried in an oven overnight at a temperature of approximately 110° C. The solid was ground to a powder suitable for use as a nucleating agent for thermoplastics.

EXAMPLE 22

This example demonstrates the production of thermoplastic polymer compositions according to the invention and the nucleating capabilities of certain metals salts of aromatic sulfonic acids. The zinc benzenesulfonate produced in Example 1 was combined with a polypropylene homopolymer to produce a thermoplastic polymer composition according to the invention (Sample 22). The thermoplastic polymer composition contained approximately 2,000 grams of a polypropylene homopolymer having a melt flow index of approximately 12 g/10 min, approximately 500 parts-per-million (ppm) of a primary antioxidant (Irganox® 1010 antioxidant from Ciba), approximately 1,000 ppm of a secondary antioxidant (Irgafos® 168 antioxidant from Ciba), approximately 800 ppm of calcium stearate, and approximately 2,000 ppm of the zinc benzenesulfonate (ZnBSA). A comparative thermoplastic polymer composition (Comparative Sample 1) was produced by using the same polypropylene homopolymer composition without any nucleating agent added.

The thermoplastic polymer composition according to the invention (i.e., Sample 22) was produced by dry blending the aforementioned components in a Henschel mixer at about 1,500 rpm and extruded through a single screw extruder at a temperature of approximately 200-230° C. The extrudate was then pelletized. The pelletized thermoplastic polymer composition of the invention was then injection molded to form plaques suitable for use in conducting the tests described below. The comparative thermoplastic polymer composition (Comparative Sample 1) was also injection molded to form similar plaques suitable for testing.

The peak polymer recrystallization temperature ($T_c$) for the thermoplastic polymer compositions was measured using a differential scanning calorimeter in accordance with ASTM Standard D 794-85. In particular, a sample was taken from the target plaque and heated at a rate of 20° C./minute from a temperature of 60° C. to 220° C., held at 220° C. for two minutes, and cooled at a rate of approximately 20° C./minute to a temperature of 60° C. The temperature at which peak polymer crystal reformation occurred (which corresponds to the peak polymer recrystallization temperature) was recorded for each sample and is reported in Table 1 below.

The haze of the thermoplastic polymer compositions was measured in accordance with ASTM Standard D 1003-92. The results of these measurements are also reported in Table 1 below.

TABLE 1

Haze measurements and peak polymer recrystallization temperatures for Sample 22 and Comparative Sample 1 (C.S. 1).

| Sample | Additive | Additive Conc. (ppm) | Haze (%) | $T_c$ (° C.) |
| --- | --- | --- | --- | --- |
| C.S. 1 | — | — | 56.0 | 110.0 |
| 22 | ZnBSA | 0.2 | 34.5 | 120.7 |

As can be seen from the data set forth in Table 1, the thermoplastic polymer composition according to the invention exhibited significant improvements in both optical properties (e.g., lower haze value) and peak polymer recrystallization temperature relative to the virgin polypropylene homopolymer. As will be understood by those of skill in the art, higher peak polymer recrystallization temperatures such as those exhibited by the thermoplastic polymer composition of the invention typically enable the use of shorter cycle times in molding operations due to the fact that the polymer does not need to be cooled as much before it can be removed from the mold without deformation. Furthermore, the lower haze values exhibited by the thermoplastic polymer composition of the invention indicate that this polymer composition will likely be useful in the production of molded thermoplastic articles with improved optical properties.

EXAMPLE 23

This example demonstrates the production of thermoplastic polymer compositions according to the invention and the nucleating capabilities of certain metals salts of aromatic sulfonic acids. The metal salts produced in Examples 1-21 were separately combined with a high density polyethylene polymer to produce twenty-one thermoplastic polymer compositions according to the invention (i.e., Samples 23A-23U). The high density polyethylene polymer had a density of approximately 0.952 g/cm$^3$ and a melt flow index of 19 g/10 min, as measured in accordance with ASTM Standard D1238-04c using a 2.16 kg weight. A comparative thermoplastic polymer composition (Comparative Sample 2) was produced by using the high density polyethylene polymer alone (i.e., without any nucleating agent). Four additional comparative thermoplastic polymer compositions (Comparative Samples 3-6) were produced by combining the same high density polyethylene polymer with one of sodium 1-dodecanesulfonate (NaDDS in Comparative Sample 3), sodium dodecylbenzenesulfonate (NaDDBS in Comparative Sample 4), zinc benzenesulfinate dihydrate (ZnBSD in Comparative Sample 5), or talc (Comparative Sample 6). The amount of nucleating agent contained in each sample is noted in Table 2 below.

In order to test for shrinkage, flexural modulus, and/or plaque haze, the thermoplastic polymer composition was produced by first combining the polyethylene polymer and the nucleating agent in a powdered form and then mixing the two for at least approximately 5 minutes using a KitchenAid® stand mixer. The resulting mixture was then melt extruded on a single screw extruder to produce a pelletized thermoplastic polymer composition. Each pelletized thermoplastic polymer composition was then formed into a part suitable for physical testing via injection molding or compression molding. The parts formed from the thermoplastic polymer compositions were then subjected to the tests described below. For example, selected thermoplastic polymer compositions were formed into plaques having a thickness of approximately 30 mil (0.762 mm) and used to measure the haze exhibited by the thermoplastic polymer compositions.

In order to test for film haze, the thermoplastic polymer composition was produced by first combining ground polyethylene polymer with the nucleating agent and then mixing the two for approximately two minutes in a high intensity mixer. The resulting mixture was then extruded into a cast film on a Randcastle extruder with the chill roll of the extruder set at a temperature of approximately 80° C. The resulting cast film had an average thickness of approximately 35 μm. The resulting films were also used to measure the peak polymer recrystallization temperature of those thermoplastic polymer compositions that were not formed into parts for testing as described in the preceding paragraph.

The peak polymer recrystallization temperature ($T_c$) for the thermoplastic polymer compositions was measured using a differential scanning calorimeter in accordance with ASTM Standard D 794-85. In particular, a sample was taken from the target part and heated at a rate of 20° C./minute from a temperature of 60° C. to 220° C., held at 220° C. for two minutes, and cooled at a rate of approximately 10° C./minute to a temperature of 60° C. The temperature at which peak polymer crystal reformation occurred (which corresponds to the peak polymer recrystallization temperature) was recorded for each sample. The change in peak polymer recrystallization temperature ($\Delta T_c$) exhibited by the thermoplastic polymer composition relative to the virgin, polyethylene polymer is reported in Table 2 below.

The flexural properties for select parts were measured in the machine direction (MD) in accordance with ASTM Standard D790. The flexural modulus for the tested parts is reported as the 1% secant modulus in Table 2 below.

TABLE 2

Select physical properties of parts produced using Samples 23A-23U, Comparative Sample 2 (C.S. 2), Comparative Sample 3 (C.S. 3), Comparative Sample 4 (C.S. 4), Comparative Sample 5 (C.S. 5), and Comparative Sample 6 (C.S. 6).

| Sample | Nucleating Agent Type | Loading (ppm) | Film Haze (%) | Plaque Haze (%) | $\Delta T_c$ (° C.) | Flexural Modulus (MPa) |
|---|---|---|---|---|---|---|
| C.S. 2 | — | — | — | 40.1 | 97.9 | — | 760 |
| 23A | Ex. 1 | 1,000 | 10.9 | 57.7 | +1.3 | 997 |
| 23B | Ex. 2 | 1,000 | 19.4 | 84.3 | +2.7 | 965 |
| 23C | Ex. 3 | 2,000 | 12.5 | 84.5 | +1.3 | 913 |
| 23D | Ex. 4 | 2,000 | 20.7 | — | +3.0 | — |
| 23E | Ex. 5 | 1,000 | 15.1 | — | +2.5 | 897 |
| 23F | Ex. 6 | 1,000 | 11.5 | 81 | +2.3 | 941 |
| 23G | Ex. 7 | 2,000 | 14.1 | — | +2.1 | — |
| 23H | Ex. 8 | 1,000 | 40.1 | 99.6 | +1.5 | 968 |
| 23I | Ex. 9 | 1,000 | 28.3 | 99.1 | 0 | — |
| 23J | Ex. 10 | 2,000 | 43.1 | 93.3 | 0 | — |
| 23K | Ex. 11 | 2,000 | 45.3 | — | +0.3 | — |
| 23L | Ex. 12 | 2,000 | 30.4 | — | +0.2 | — |
| 23M | Ex. 13 | 2,000 | 44.2 | 94.6 | 0 | — |
| 23N | Ex. 14 | 2,000 | 38.7 | — | +1.7 | — |
| 23O | Ex. 15 | 1,000 | 12.6 | 90.0 | +0.9 | — |
| 23P | Ex. 16 | 1,000 | 12.2 | 74.5 | +1.3 | 989 |
| 23Q | Ex. 17 | 2,000 | 47.9 | — | 0 | — |
| 23R | Ex. 18 | 2,000 | 40.0 | — | 0 | — |
| 23S | Ex. 19 | 2,000 | 11.8 | — | +4.3 | — |
| 23T | Ex. 20 | 2,000 | 16.0 | 84.5 | +1.0 | — |
| 23U | Ex. 21 | 2,000 | 16.2 | — | +0.8 | — |
| C.S. 3 | NaDDS | 2,000 | 41.9 | 99 | 0 | — |
| C.S. 4 | NaDDBS | 2,000 | 37.0 | 99 | 0 | — |
| C.S. 5 | ZnBSD | 2,000 | 42.7 | 90.6 | 0 | — |
| C.S. 6 | Talc | 1,000 | 34.0 | 91.5 | +2.0 | — |

As can be seen from the data set forth in Table 2, many of the polyethylene-containing thermoplastic polymer compositions according to the invention exhibit lower haze values (in either film, plaque, or both) than the virgin polyethylene polymer. In particular, Samples 23A, 23B, 23C, 23D, 23E, 23F, 23G, 23O, 23P, 23S, 23T, and 23U show marked improvements in the haze values exhibited by films made using such thermoplastic polymer compositions relative to films made using the virgin polyethylene polymer. Sample 23A also shows a significant improvement in haze values exhibited by plaques made using the thermoplastic polymer composition relative to plaques made using the virgin polyethylene polymer. The improvements in optical properties observed for these thermoplastic polymer compositions are believed to be important given the relative dearth of additives that are capable of producing significant improvements in the optical properties of articles made from polyethylene polymers.

Many of the polyethylene-containing thermoplastic polymer compositions according to the invention also exhibit higher peak polymer recrystallization temperatures than the virgin polyethylene polymer. For example, each of Samples 23A, 23B, 23C, 23D, 23E, 23F, 23G, 23O, 23P, 23S, 23T, and 23U show improvements in peak polymer recrystallization temperature relative to the virgin polyethylene polymer. As will be understood by those of skill in the art, higher peak polymer recrystallization temperatures typically enable the use of shorter cycle times in molding operations due to the fact that the polymer does not need to be cooled as much before it can be removed from the mold without deformation. Furthermore, while some of the increases in peak polymer recrystallization temperature may be modest in comparison to the increases exhibited by other known nucleating agents, even a modest improvement in peak polymer recrystallization temperature is believed to be significant when it is coupled with the significant improvement in optical properties observed for each of these polymer compositions.

The data set forth in Table 2 also shows that the thermoplastic polymer compositions of the invention exhibit appreciable improvements in flexural modulus relative to the virgin polyethylene polymer. For example, each of Samples 23A, 23B, 23C, 23E, 23F, and 23P exhibited at least an 18% increase in flexural modulus relative to the virgin polyethylene polymer. As with the improvements in peak polymer recrystallization temperature discussed above, these improvements in flexural modulus are believed to be significant when coupled with the significant improvement in optical properties observed for each of these polymer compositions.

An examination of the comparative samples also shows that these thermoplastic polymer compositions do not exhibit the desirable combination of properties (e.g., lower haze values and higher peak polymer recrystallization temperatures) generally exhibited by thermoplastic polymer compositions according to the invention. For example, Comparative Sample 3 shows that metal salts of alkylsulfonic acids do not exhibit the desirable nucleating properties generally observed for metal salts of aromatic sulfonic acids, such as those encompassed by the present invention. Comparative Sample 4 also shows that metal salts of aromatic sulfonic acids that are substituted with one or more relatively large substituents (e.g., a $C_{12}$ alkyl group) do not exhibit the desirable nucleating properties generally observed for metal salts of aromatic sulfonic acids that are unsubstituted or substituted with relatively small substituents. Comparative Sample 5 also shows that metal salts of aromatic sulfinic acids do not exhibit the desirable nucleating properties generally observed for metal salts of aromatic sulfonic acids, such as those encompassed by the present invention.

EXAMPLE 24

This example demonstrates some of the physical properties exhibited by a high density polyethylene polymer that has been nucleated with a nucleating agent according to the invention. Three polymer compositions (i.e., Samples 24A, 24B, and 24C) were prepared by respectively compounding 500 ppm, 1,000 ppm, and 2,000 ppm of zinc benzenesulfonate into a commercially-available, high density polyethylene polymer having a density of approximately 0.952 g/cm$^3$ and a melt flow index of approximately 19 dg/minute. The polymer compositions were then injection molded into containers on a 300 ton Netstal injection molding machine. For purposes of comparison, containers were also molded using the same commercially-available, high density polyethylene polymer without a nucleating agent being added (Comparative Sample 24). The optical properties of the containers were then measured at the container sidewalls, and the flexural and impact properties were measured using samples drawn from the bottom portion of the containers. The stiffness-impact balance of the samples was calculated by multiplying the flexural modulus (expressed in MPa) and the Gardner impact resistant (expressed in J). The standard deviation of the stiffness-impact balance was calculated using the following equation $$\left(\frac{\sigma_{S/I}}{S/I}\right)^2 = \left(\frac{\sigma_{flex}}{flex}\right)^2 + \left(\frac{\sigma_{impact}}{impact}\right)^2.$$

The values obtained for the samples are reported in Tables 3-6 below.

TABLE 3

Flexural modulus of Samples 24A-24C and Comparative Sample 24.

| Sample | Loading (ppm) | Flexural Modulus (MPa) | Standard Deviation (MPa) |
|---|---|---|---|
| Comparative 24 | — | 1115 | 11 |
| 24A | 500 | 1161 | 6 |
| 24B | 1,000 | 1199 | 4 |
| 24C | 2,000 | 1211 | 2 |

TABLE 4

Gardner impact resistance of Samples 24A-24C and Comparative Sample 24.

| Sample | Loading (ppm) | Gardner Impact Resistance (J) | Standard Deviation (J) |
|---|---|---|---|
| Comparative 24 | — | 12 | 0.39 |
| 24A | 500 | 14.1 | 0.47 |
| 24B | 1,000 | 11.2 | 0.28 |
| 24C | 2,000 | 10.8 | 0.16 |

TABLE 5

Stiffness-impact balance of Samples 24A-24C and Comparative Sample 24.

| Sample | Loading (ppm) | Stiffness-impact Balance (MPa*J) | Standard Deviation (MPa*J) |
|---|---|---|---|
| Comparative 24 | — | 13715 | 455.4 |
| 24A | 500 | 16370 | 552.2 |
| 24B | 1,000 | 13429 | 338.7 |
| 24C | 2,000 | 13079 | 195.0 |

TABLE 6

Optical properties of Samples 24A-24C and Comparative Sample 24.

| | | 1 mm Thickness | | 1.5 mm Thickness | |
|---|---|---|---|---|---|
| Sample | Loading (ppm) | Haze (%) | Clarity (%) | Haze (%) | Clarity (%) |
| Comparative 24 | — | 100.0 | 34.8 | 100.0 | 2.9 |
| 24A | 500 | 79.7 | 97.4 | 91.4 | 96.7 |
| 24B | 1,000 | 76.7 | 97.9 | 89.2 | 97.2 |
| 24C | 2,000 | 77.3 | 97.3 | 89.4 | 97.0 |

EXAMPLE 25

This example demonstrates some of the physical properties exhibited by a linear low density polyethylene polymer that has been nucleated with a nucleating agent according to the invention. Three polymer compositions (i.e., Samples 25A, 25B, and 25C) were prepared by respectively compounding 500 ppm, 1,000 ppm, and 2,000 ppm of zinc benzenesulfonate into a commercially-available, linear low density polyethylene polymer having a density of approximately 0.917 g/cm$^3$ and a melt flow index of approximately 24 dg/minute. The polymer compositions were then injection molded into containers on a 300 ton Netstal injection molding machine. For purposes of comparison, containers were also molded using the same commercially-available, high density polyethylene polymer without a nucleating agent being added (Comparative Sample 25). The optical properties of the containers were then measured at the container sidewalls, and the flexural and impact properties were measured using samples drawn from the bottom portion of the containers. The stiffness-impact balance of the samples and the standard deviation of the stiffness-impact balance were calculated as described above in Example 24. The values obtained for the samples are reported in Tables 7-10 below.

TABLE 7

Flexural modulus of Samples 25A-25C and Comparative Sample 25.

| Sample | Loading (ppm) | Flexural Modulus (MPa) | Standard Deviation (MPa) |
|---|---|---|---|
| C.S. 25 | — | 266 | 1 |
| 25A | 500 | 300 | 2 |
| 25B | 1,000 | 323 | 5 |
| 25C | 2,000 | 334 | 3 |

TABLE 8

Gardner impact resistance of Samples 25A-25C and Comparative Sample 25.

| Sample | Loading (ppm) | Gardner Impact Resistance (J) | Standard Deviation (J) |
|---|---|---|---|
| C.S. 25 | — | 6 | 0.43 |
| 25A | 500 | 9 | 0.22 |
| 25B | 1,000 | 9 | 0.14 |
| 25C | 2,000 | 9.2 | 0.17 |

TABLE 9

Stiffness-impact balance of Samples 25A-25C and Comparative Sample 25.

| Sample | Loading (ppm) | Stiffness-impact Balance (MPa*J) | Standard Deviation (MPa*J) |
|---|---|---|---|
| C.S. 25 | — | 1543 | 114.5 |
| 25A | 500 | 2700 | 68.4 |
| 25B | 1,000 | 2907 | 63.8 |
| 25C | 2,000 | 3073 | 63.1 |

TABLE 10

Optical properties of Samples 25A-25C and Comparative Sample 25.

| | | 1 mm Thickness | | 1.5 mm Thickness | |
|---|---|---|---|---|---|
| Sample | Loading (ppm) | Haze (%) | Clarity (%) | Haze (%) | Clarity (%) |
| C.S. 25 | — | 79.7 | 95.4 | 71.7 | 11.8 |
| 25A | 500 | 76.9 | 95.9 | 97.3 | 92.6 |
| 25B | 1,000 | 62.8 | 76.1 | 98.6 | 95.5 |
| 25C | 2,000 | 62.0 | 73.2 | 97.7 | 98.0 |

EXAMPLE 26

This example demonstrates some of the physical properties exhibited by a linear low density polyethylene polymer that has been nucleated with a nucleating agent according to the invention. Two polymer compositions (i.e., Samples 26A and 26B) were prepared by respectively compounding 500 ppm and 1,000 ppm of zinc benzenesulfonate into a commercially-available, linear low density polyethylene polymer having a density of approximately 0.918 g/cm³ and a melt flow index of approximately 1 dg/minute. For purposes of comparison, a third polymer composition (i.e., Comparative Sample 26Y) was prepared by compounding approximately 1,000 ppm of HYPERFORM® 20E (available from Milliken & Company) into the same linear low density polyethylene polymer. The polymer compositions were then used to produce blown films on a Future Design film line with the following setup: 4 inch die, 2.0 mm die gap, BUR 2.5, DDR 21, and output 29 kg/h. For purposes of comparison, blown film (i.e., Comparative Sample 26X) was also produced using the virgin linear low density polyethylene polymer (i.e., the polymer without any nucleating agent). The tear strength, dart drop impact, Young's modulus, and haze of the resulting films were measured and are reported in Tables 11-14.

TABLE 11

Tear strength of Samples 26A and 26B and Comparative Samples 26X and 26Y.

| | | Machine Direction | | Transverse Direction | |
|---|---|---|---|---|---|
| Sample | Loading (ppm) | Tear Strength (g) | Standard Deviation (g) | Tear Strength (g) | Standard Deviation (g) |
| C.S. 26X | — | 705.6 | 90.7 | 997.1 | 52.7 |
| C.S. 26Y | 1,000 | 617.0 | 46.9 | 981.8 | 78.2 |
| 26A | 500 | 852.5 | 85.4 | 1043.2 | 64.6 |
| 26B | 1,000 | 820.5 | 64.2 | 965.1 | 53.0 |

TABLE 12

Dart drop impact of Samples 26A and 26B and Comparative Samples 26X and 26Y.

| Sample | Loading (ppm) | Dart Drop Impact (g) | Standard Deviation (g) |
|---|---|---|---|
| C.S. 26X | — | 225.5 | 1.2 |
| C.S. 26Y | 1,000 | 227.0 | 1.5 |
| 26A | 500 | 330.2 | 1.1 |
| 26B | 1,000 | 315.5 | 1.1 |

TABLE 13

Young's modulus of Samples 26A and 26B and Comparative Samples 26X and 26Y.

| | | Machine Direction | | Transverse Direction | |
|---|---|---|---|---|---|
| Sample | Loading (ppm) | Young's Modulus (MPa) | Standard Deviation (MPa) | Young's Modulus (MPa) | Standard Deviation (MPa) |
| C.S. 26X | — | 151.2 | 14.5 | 218.5 | 25.1 |
| C.S. 26Y | 1,000 | 166.1 | 17.2 | 234.3 | 19.5 |
| 26A | 500 | 141.1 | 10.1 | 179.1 | 9.1 |
| 26B | 1,000 | 145.3 | 2.5 | 160.8 | 19.6 |

TABLE 14

Haze of Samples 26A and 26B and Comparative Samples 26X and 26Y.

| Sample | Loading (ppm) | Haze (%) | Standard Deviation (%) |
|---|---|---|---|
| C.S. 26X | — | 18.1 | 0.7 |
| C.S. 26Y | 1,000 | 10.2 | 0.2 |
| 26A | 500 | 10.3 | 0.7 |
| 26B | 1,000 | 10.5 | 0.4 |

EXAMPLE 27

This example demonstrates some of the physical properties exhibited by a high density polyethylene polymer that has been nucleated with a nucleating agent according to the invention. A polymer composition (i.e., Sample 27A) was prepared by compounding approximately 2,000 ppm of zinc benzenesulfonate into a commercially-available, high density polyethylene polymer having a density of approximately 0.962 g/cm$^3$ and a melt flow index of approximately 0.9 dg/minute. For purposes of comparison, a second polymer composition (i.e., Comparative Sample 27Y) was prepared by compounding approximately 2,000 ppm of HYPERFORM® 20E (available from Milliken & Company) into the same high density polyethylene polymer. The polymer compositions were then used to produce blown films on a Future Design film line with the following setup: 4 inch die, 2.0 mm die gap, BUR 2.3, DDR 21, and output 29 kg/h. For purposes of comparison, blown film (i.e., Comparative Sample 27X) was also produced using the virgin high density polyethylene polymer (i.e., the polymer without any nucleating agent). The dart drop impact of the resulting films was measured and is reported in Table 15.

TABLE 15

Dart drop impact of Samples 27A and Comparative Samples 27X and 27Y.

| Sample | Loading (ppm) | Dart Drop Impact (g) | Standard Deviation (g) |
|---|---|---|---|
| C.S. 27X | — | 59.0 | 1.1 |
| C.S. 27Y | 2,000 | n.d. | 1.3 |
| 27A | 2,000 | 73.9 | 0.8 |

The dart drop impact of Comparative Sample 27Y proved to be too low to determine using the test method. Accordingly, the value for Comparative Sample 27Y is reported as "n.d."

EXAMPLE 28

This example demonstrates some of the physical properties exhibited by a high density polyethylene polymer that has been nucleated with a nucleating agent according to the invention. A polymer composition (i.e., Sample 28A) was prepared by compounding approximately 3 wt. % of zinc benzenesulfonate into a commercially-available, high density polyethylene polymer having a density of approximately 0.952 g/cm$^3$ and a melt flow index of approximately 19 dg/minute. For purposes of comparison, a second polymer composition (i.e., Comparative Sample 28Y) was prepared by compounding approximately 3 wt. % of HYPERFORM® 20E (available from Milliken & Company) into the same high density polyethylene polymer. The polymer compositions were then let down at a ratio of approximately 3% into another commercially-available high density polymer having a density of approximately 0.953 g/cm$^3$ and a melt flow index of approximately 6 dg/minute and the resulting polymer blends were injection molded. The resulting parts were then tested to determine their multi-axial impact at temperatures of 23° C. and −30° C., tensile strength at yield, flexural chord modulus, shrinkage in the machine direction (i.e., with flow), and shrinkage in the transverse direction (i.e., cross flow). The measured values for each sample and the virgin high density polyethylene polymer (Comparative Sample 28X) are reported in Table 16 below.

TABLE 16

Select physical properties of Sample 28A and Comparative Samples 28X and 28Y.

| Property | C.S. 28X | C.S. 28Y | 28A |
|---|---|---|---|
| Multi-Axial Impact (2.2 m/s at 23° C.) | 17.99 J<br>5 Ductile | 17.00 J<br>5 Ductile | 17.24 J<br>5 Ductile |
| Multi-Axial Impact (2.2 m/s at −30° C.) | 21.24 J<br>5 Ductile | 20.49 J<br>5 Ductile | 20.33 J<br>5 Ductile |
| Tensile Strength at Yield | 3,161 psi<br>(21.79 MPa) | 3,445 psi<br>(23.75 MPa) | 3,445 psi<br>(23.75 MPa) |
| Flexural Chord Modulus | 136,877 psi<br>(943.734 MPa) | 129,682 psi<br>(894.126 MPa) | 135,850 psi<br>(922.863 MPa) |
| M.D. Shrinkage | 2.69% | 2.35% | 2.21% |
| T.D. Shrinkage | 2.71% | 1.81% | 2.17% |

EXAMPLE 29

This example demonstrates some of the physical properties exhibited by a high density polyethylene polymer that has been nucleated with a nucleating agent according to the invention. A polymer composition (i.e., Sample 29A) was prepared by compounding approximately 3 wt. % of zinc benzenesulfonate into a commercially-available, high density polyethylene polymer having a density of approximately 0.952 g/cm$^3$ and a melt flow index of approximately 19 dg/minute. For purposes of comparison, a second polymer composition (i.e., Comparative Sample 29Y) was prepared by compounding approximately 3 wt. % of HYPERFORM® 20E (available from Milliken & Company) into the same high density polyethylene polymer. The polymer compositions were then let down at a ratio of approximately 3% into another commercially-available high density polymer having a melt flow index of approximately 35 dg/minute and the resulting polymer blends were injection molded. The resulting parts were then tested to determine their multi-axial impact at temperatures of 23° C. and −30° C., tensile strength at yield, flexural chord modulus, shrinkage in the machine direction (i.e., with flow), and shrinkage in the transverse direction (i.e., cross flow). The measured values for each sample and the virgin high density polyethylene polymer (Comparative Sample 29X) are reported in Table 17 below.

TABLE 17

Select physical properties of Sample 29A
and Comparative Samples 29X and 29Y.

| Property | C.S. 29X | C.S. 29Y | 29A |
|---|---|---|---|
| Multi-Axial Impact (2.2 m/s at 23° C.) | 6.31 J 5 Brittle | 15.55 J 5 Ductile | 16.02 J 5 Ductile |
| Multi-Axial Impact (2.2 m/s at −30° C.) | 7.86 J 5 Brittle | 19.79 J 5 Ductile | 20.40 J 5 Ductile |
| Tensile Strength at Yield | 3,005 psi (20.72 MPa) | 3,466 psi (23.90 MPa) | 3,246 (22.38 MPa) |
| Flexural Chord Modulus | 119,517 psi (824.041 MPa) | 131,205 psi (904.627 MPa) | 139,981 psi (965.135 MPa) |
| M.D. Shrinkage | 2.48% | 1.8% | 1.81% |
| T.D. Shrinkage | 2.38% | 1.72% | 2.32% |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A thermoplastic polymer composition comprising:
(a) a thermoplastic polymer; and
(b) a nucleating agent, the nucleating agent comprising a compound conforming to the structure of one of Formula (I), Formula (II), or Formula (III) below

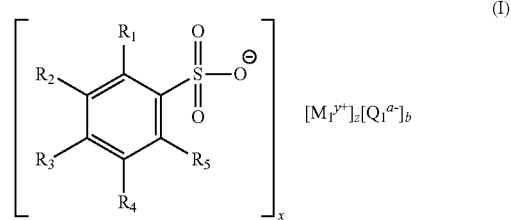
(I)

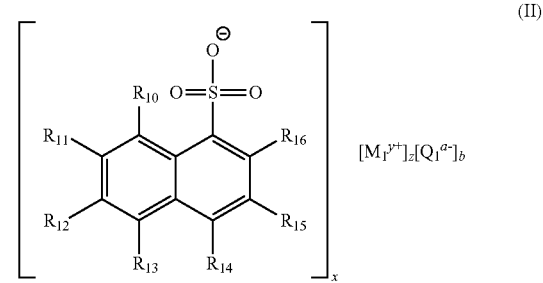
(II)

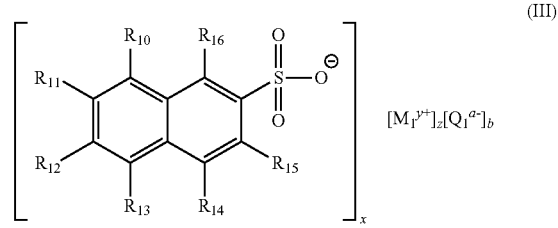
(III)

wherein x is a positive integer; $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms; each $M_1$ is a cation selected from the group consisting of transition metal cations; y is the valence of the metal cation; b is zero or a positive integer; when b is one or greater, each $Q_1$ is a negatively-charged counterion and a is the valence of the negatively-charged counterion; and the values of x, y, z, a, and b satisfy the equation x+(ab)=yz.

2. The thermoplastic polymer composition of claim 1, wherein $M_1$ is a zinc cation.

3. The thermoplastic polymer composition of claim 1, wherein $R_1$, $R_2$, $R_3$, $R_4$, $R_5$, $R_{10}$, $R_{11}$, $R_{12}$, $R_{13}$, $R_{14}$, $R_{15}$, and $R_{16}$ are each hydrogen.

4. The thermoplastic polymer composition of claim 1, wherein the nucleating agent is present in the thermoplastic polymer composition in an amount of about 100 to about 5,000 parts-per-million (ppm), based on the total weight of the thermoplastic polymer composition.

5. A thermoplastic polymer composition comprising:
(a) a polyethylene polymer; and
(b) a nucleating agent, the nucleating agent comprising a compound conforming to the structure of one of Formula (I), Formula (II), or Formula (III) below

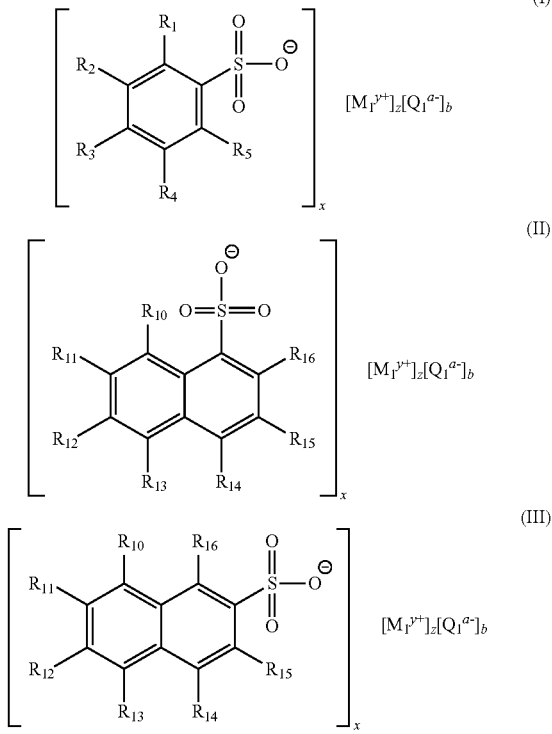

wherein x is a positive integer; $R_1$, $R_2$, $R_3$, $R_4$, $R_5$, $R_{10}$, $R_{11}$, $R_{12}$, $R_{13}$, $R_{14}$, $R_{15}$, and $R_{16}$ are substituents independently selected from the group consisting of hydrogen, hydroxyl, $C_1$-$C_9$ alkyl groups, $C_1$-$C_9$ alkenyl groups, $C_1$-$C_9$ alkynyl groups, $C_1$-$C_9$ alkoxy groups, $C_1$-$C_9$ hydroxyalkyl groups, alkyl ether groups, amine groups, $C_1$-$C_9$ alkylamine groups, halogens, aryl groups, alkylaryl groups, and geminal or vicinal carbocyclic groups having up to nine carbon atoms; each $M_1$ is a cation selected from the group consisting of metal cations and organic cations; y is the valence of the cation, $M_1$; b is zero or a positive integer; when b is one or greater, each $Q_1$ is a negatively-charged counterion and a is the valence of the negatively-charged counterion; and the values of x, y, z, a, and b satisfy the equation x+(ab)=yz.

6. The thermoplastic polymer composition of claim 5, wherein $M_1$ is a metal cation selected from the group consisting of alkali metal cations, alkaline earth metal cations, transition metal cations, and group 13 metal cations.

7. The thermoplastic polymer composition of claim 6, wherein the metal cation is selected from the group consisting of aluminum, calcium, magnesium, sodium, and zinc.

8. The thermoplastic polymer composition of claim 5, wherein $R_1$, $R_2$, $R_3$, $R_4$, $R_5$, $R_{10}$, $R_{11}$, $R_{12}$, $R_{13}$, $R_{14}$, $R_{15}$, and $R_{16}$ are each hydrogen.

9. The thermoplastic polymer composition of claim 5, wherein the compound conforms to the structure of Formula (I), $R_1$, $R_2$, $R_3$, $R_4$, and $R_5$ are each hydrogen, and $M_1$ is selected from the group consisting of aluminum, calcium, magnesium, sodium and zinc.

10. The thermoplastic polymer composition of claim 5, wherein the compound conforms to the structure of Formula (I), $R_1$, $R_2$, $R_3$, $R_4$, and $R_5$ are each hydrogen, and $M_1$ is zinc.

11. The thermoplastic polymer composition of claim 5, wherein the compound conforms to the structure of Formula (I), $R_1$, $R_2$, $R_3$, $R_4$, and $R_5$ are each hydrogen, and $M_1$ is a piperazinium cation.

12. The thermoplastic polymer composition of claim 5, wherein the compound conforms to the structure of Formula (I), $R_1$, $R_2$, $R_4$, and $R_5$ are each hydrogen, $R_3$ is methyl, and $M_1$ is zinc.

13. The thermoplastic polymer composition of claim 5, wherein the compound conforms to the structure of Formula (III), $R_{10}$, $R_{11}$, $R_{12}$, $R_{13}$, $R_{14}$, $R_{15}$, and $R_{16}$ are each hydrogen, and $M_1$ is selected from the group consisting of aluminum, calcium, magnesium, sodium, and zinc.

14. The thermoplastic polymer composition of claim 5, wherein the compound conforms to the structure of Formula (III), $R_{10}$, $R_{11}$, $R_{12}$, $R_{13}$, $R_{14}$, $R_{15}$, and $R_{16}$ are each hydrogen, and $M_1$ is zinc.

15. The thermoplastic polymer composition of claim 5, wherein the polyethylene polymer is selected from the group consisting of medium density polyethylenes, high density polyethylenes, and mixtures thereof.

16. The thermoplastic polymer composition of claim 15, wherein the polyethylene polymer is a high density polyethylene.

17. The thermoplastic polymer composition of claim 5, wherein the nucleating agent is present in the thermoplastic polymer composition in an amount of about 100 to about 5,000 parts-per-million (ppm), based on the total weight of the thermoplastic polymer composition.

* * * * *